United States Patent [19]

Kazama et al.

[11] Patent Number: 4,875,110
[45] Date of Patent: Oct. 17, 1989

[54] ROTARY HEAD APPARATUS WITH MOTOR MAGNET AND YOKE SURROUNDING MOTOR STATOR COIL

[75] Inventors: Saburo Kazama, Hiratsuka; Akira Tamura, Ibaraki, both of Japan

[73] Assignee: Hitachi Ltd., Tokyo, Japan

[21] Appl. No.: 917,068

[22] Filed: Oct. 8, 1986

[30] Foreign Application Priority Data

Oct. 9, 1985 [JP] Japan ................................ 60-223559

[51] Int. Cl.⁴ .......................................... G11B 15/61
[52] U.S. Cl. ..................................... 360/64; 360/84; 360/108; 360/130.24; 310/268
[58] Field of Search ................... 360/130, 24, 84, 64, 360/107, 108, 67, 68; 310/156, 261, 268

[56] References Cited

U.S. PATENT DOCUMENTS

| | | | |
|---|---|---|---|
| 3,673,349 | 6/1972 | Berg | 360/64 |
| 4,117,519 | 9/1978 | Shioyama et al. | 360/84 |
| 4,316,225 | 2/1982 | Maruyama et al. | 360/107 |
| 4,347,536 | 8/1982 | Miyoshita | 360/107 |
| 4,354,211 | 10/1982 | Gilovich et al. | 360/84 |
| 4,394,594 | 7/1983 | Schmider et al. | 310/268 X |
| 4,490,759 | 12/1984 | Maruyama | 360/107 |
| 4,564,876 | 1/1986 | Takahashi et al. | 360/107 |
| 4,623,944 | 11/1986 | Yamashita | 360/84 |
| 4,639,805 | 1/1987 | Hirota | 360/64 |
| 4,641,214 | 2/1987 | Imanishi | 360/130.24 |
| 4,695,795 | 9/1987 | Nakamizo | 360/84 |
| 4,706,143 | 11/1987 | Asada | 360/130.24 |

FOREIGN PATENT DOCUMENTS

| | | | |
|---|---|---|---|
| 39-16166 | 8/1964 | Japan . | |
| 42628 | 3/1984 | Japan | 360/130.24 |
| 59-60729 | 4/1984 | Japan . | |
| 61-253 | 3/1986 | Japan | 360/130.24 |

Primary Examiner—Alan Faber
Assistant Examiner—W. R. Young
Attorney, Agent, or Firm—Antonelli, Terry & Wands

[57] ABSTRACT

A rotary head apparatus includes magnetic heads on its outer peripheral portion and rotatably supported in a hollow space defined by fixed hollow upper and lower cylindrical drums, a brushless motor stator coil attached to one or the other of the fixed drums, and a brushless motor magnet and yoke, or a first and a second magnets, arranged on the rotary head apparatus on both sides of the stator coil with a gap therebetween.

15 Claims, 18 Drawing Sheets

ROTARY HEAD APPARATUS WITH MOTOR MAGNET AND YOKE SURROUNDING MOTOR STATOR COIL

BACKGROUND OF THE INVENTION

The present invention relates to a rotary head apparatus and more particularly to a rotary head apparatus, e.g., a cylinder motor for video tape recorders (hereinafter simply referred to as VTRs) which is well suited for recording on and reproducing magnetic signals from a recording medium.

The prior art rotary head apparatus have been generally so designed that the construction of its builtin motor includes a magnetic yoke integral with a coil within its stator as disclosed in Japanese Patent Publication No. 39-16166 and JP-A-59-60729. However, this conventional construction is disadvantageous in that during rotation of the rotor magnet, an attraction is caused between the rotor magnet and the yoke within the stator and this tends to cause a cogging torque, increase the wear of the bearings and damage the bearings. Another disadvantage is that due to the occurrence of a magnetic field variation in the yoke assembled integrally with the coil, an iron loss is caused and the motor efficiency is deteriorated. Still another disadvantage is that the magnetic field distribution in the magnetic gap tends to be disturbed and is low in uniformity. This magnetic field distribution intersects the stator coil thus tending to increase the variation of the generated torque. To overcome these disadvantages, it is essential to form a magnet magnetic circuit by decreasing the number of magnetic materials within the stator as far as possible.

SUMMARY OF THE INVENTION

With a view to overcoming the foregoing deficiencies in the prior art, it is an object of the present invention to provide a fixed shaft-type rotary head apparatus which is small in size and high in efficiency.

To accomplish the above object, in accordance with the invention there is thus provided a rotary head apparatus so designed that a motor is built into a lower drum and connected directly for direct driving purposes to a magnetic head mounting rotary member rotatable about a center shaft directly or indirectly attached to the bottom surface of the lower drum and that a stator has a twin member construction including either a combination of a rotor magnet and a yoke or a combination of a rotor magnet and a second magnet arranged on both sides with a given gap of a stator coil fixedly mounted on the inner peripheral surface of the lower drum and having a coreless or like shape with at least the rotor magnet arranged on one side of the stator coil thereby greatly reducing the iron loss, greatly decreasing the thrust attraction, ensuring a high degree of head touching performance, reducing the wear, reducing the torque ripple, increasing the magnetic field of the motor magnetic part, decreasing the size and decreasing the cost.

DESCRIPTION OF THE PREFERRED EMBODIMENTS

The present invention will now be described in greater detail with reference to the illustrated embodiments.

Figure 1:
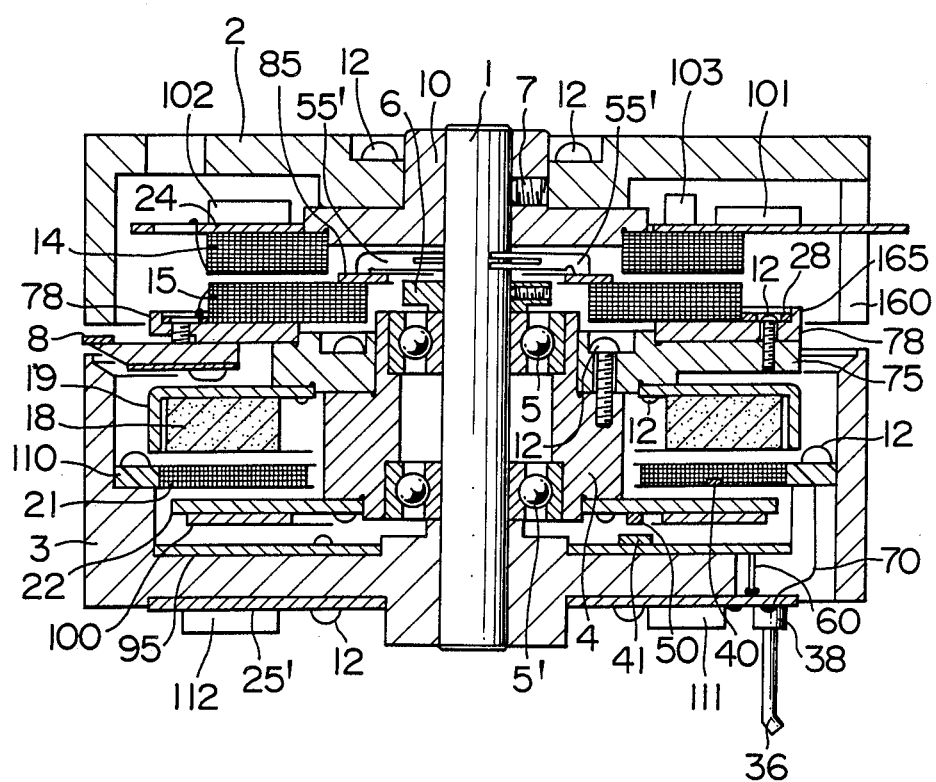
FIG. 1 is a sectional view showing the principle part of a rotary head apparatus according to a first embodiment of the invention.
Figure 2A:
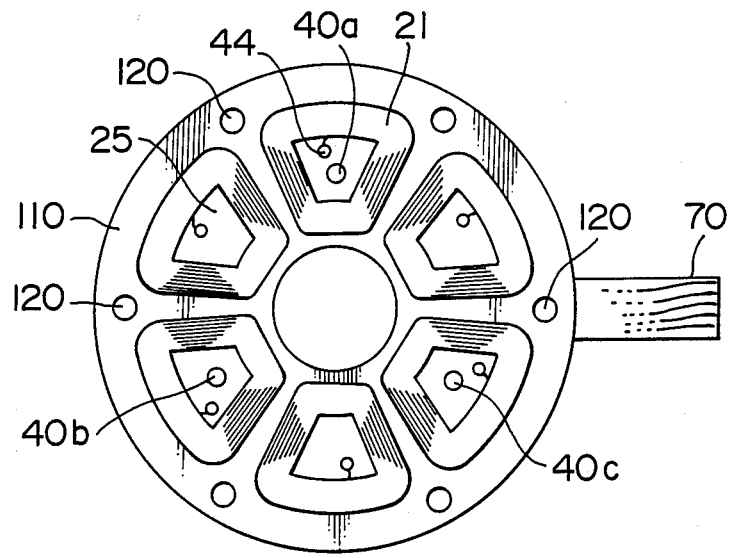
FIGS. 2A and 2B are respectively a plan view and sectional view showing the construction of the stator coil in FIG. 1.
Figure 2B:
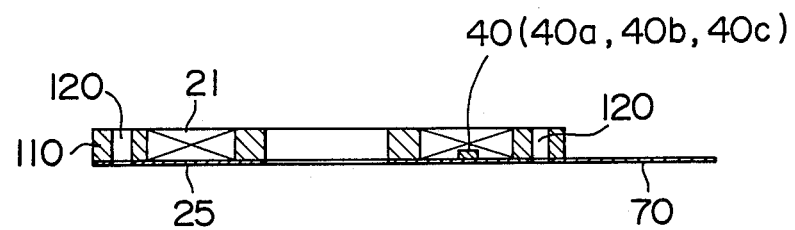
Figure 3A:
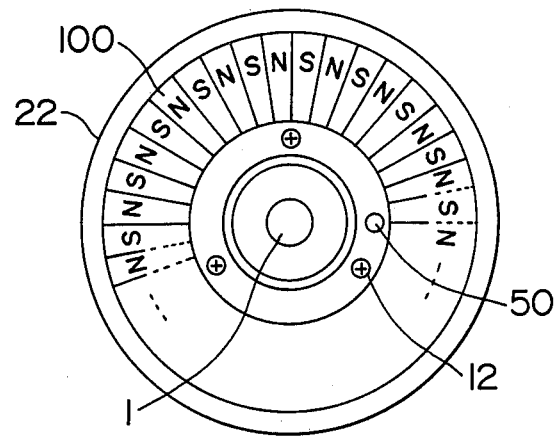
FIGS. 3A and 3B are plan views showing the construction of the FG unit in FIG. 1.
Figure 3B:
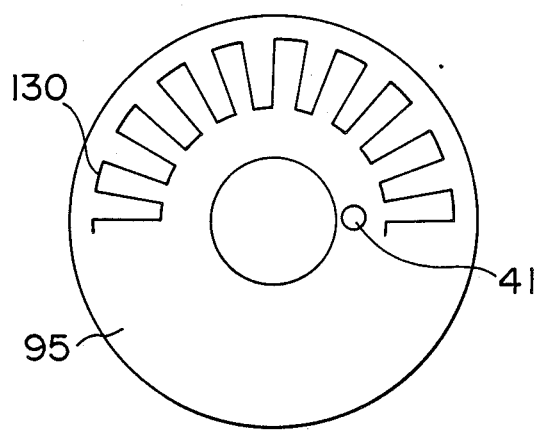

FIG. 1 shows a first embodiment of the invention and FIG. 2 shows the construction of the stator coil in the first embodiment. FIG. 3A shows the pole faces of the FG (speed detecting frequency generator) in the first embodiment and FIG. 3B shows the FG signal generating pattern board. FIG. 4 shows the construction and wiring diagram of the rotary transformer in the first embodiment. In the Figures, a center shaft 1 is fixedly mounted in the center of the bottom surface of a lower drum 3 by force fitting or the like. An upper drum 2 is fixedly mounted through a holding piece 10 on the upper part of the shaft 1 with a given distance between it and the lower drum 3. Incorporated within the intermediary space between the upper and lower drums 2 and 3 is a magnetic head driving unit including a head mounting member 78 having magnetic heads 8 and 8' mounted on the outer peripheral portion thereof, a rotary member 75, a rotary sleeve 4, a driving motor, a rotary transformer, etc. The rotary sleeve 4 includes bearings 5 and 5' which are respectively provided at its central upper and lower ends and it is rotatably fitted on the shaft 1 through the bearings 5 and 5'. The rotary member 75 is fastened to the upper end portion of the rotary sleeve 4 with screws 12. Also, the head mounting member 78 and a motor rotor (a rotor magnet 18 and a rotor yoke 19) are fixedly mounted on the rotary member 75. The two magnetic heads 8 and 8' (not shown) and a rotating yoke 15 of the flat rotary transformer are fixedly mounted on the head mounting member 78. Attached to the lower end portion of the rotary sleeve 4 with screws 23 is a yoke 22 having an FG magnet 100 and a head position detecting magnet (TACH magnet) 50 fixedly mounted thereon. The magnetic poles of the rotor magnet 18 are arranged opposite to the yoke 22 thereby forming a motor magnetic circuit therebetween. A torus stator coil 21 is disposed between the rotor magnet 18 and the yoke 22. The stator coil 21 is fastened at its outer peripheral portion to the inner side walls of the lower drum 3 with screws 12. As shown in FIG. 2, the stator coil 21 is of a coreless (having no cores in the coil poles) structure and it includes a plurality of coil poles made by winding conductors, arranged at equal intervals on the peripheral portion and encased in a molded plastic.

In this embodiment, the number of the poles in the rotor magnet 18 is 8 and it is operated by a three-phase drive system. Thus, in this embodiment the stator coil 21 includes two coil poles per phase or a total of 6 coil poles in a planar arrangement. The coil poles and sensors 40a, 40b and 40c are preliminarily connected to the connection pattern on a thin-sheet wiring board 25 and they are encased in a molded plastic thereby making the stator coil 21 into a planar rigid form. The sensors 40a to 40c are used for detecting the magnetic flux to control the switching of the coil current for imparting the turning force of the motor. Numeral 120 designates small screw holes for screwing the stator coil 21 to the lower drum 3, 70 a board lead portion, and 110 the molded plastic portion An FG board 95 is fastened with screws or the like to the inner bottom surface of the lower drum 3. FIG. 3 shows exemplary constructions of the FG magnet 100 and the FG board 95.

Shown in FIG. 3A is the arrangement of the magnet poles of the FG magnet and shown in FIG. 3B is the FG pattern on the FG board. The FG magnet 100 mounted on the yoke 22 has a greater number of poles than the rotor magnet 18 which are circumferentially magnetized at equal spacing and the FG board 95 is formed, on its surface a radial conductor pattern 130 having a pitch corresponding to the magnetization pitch of the FG magnet 100. Also wired and mounted on the surface of the FG board 95 is a sensor (TACH sensor) 41 for detecting the magnetic field of the TACH magnet 50 to generate a signal indicating the position of the magnetic head 8 or 8'. A second motor wiring board 25' is mounted on the outer bottom surface of the lower drum 3 and the terminals of the stator coil 21, the sensors 40a to 40c, the FG pattern 130 and the TACH sensor 41 are connected onto the wiring board 25'. Numeral 36 designates a lead wire portion through which connections to a servo circuit, a powder source, etc., are made. Numeral 38 designates a connector. The upper end of the rotary sleeve 4 has a diameter smaller in dimension than the inner diameter of the torus stator coil 21 so that after the rotary sleeve 4 has been fitted on the shaft 1, the stator coil 21 is fitted and held in place in the lower drum 3. A fixed yoke 14 of the flat rotary transformer is attached by adhesion to the lower end face of the holding piece 10 at the upper end of the shaft 1 and also the upper drum 2 is fastened to the upper end face of the holding plate 10 with screws 12. The fixed yoke 14 of the rotary transformer is positioned to oppose through a given narrow gap to a lower rotating yoke 15 so as to effect the transmission and reception of recording and reproduced signals between it and the magnetic heads 8 and 8'. A board 24 is mounted on the upper surface of the fixed yoke 14 and the terminals of the windings in the fixed yoke 14 are connected to the board 24. Also, signal amplifier circuits 102 (reproduction system) and 101 (recording system), a signal processing circuit 103, etc., are mounted and wired onto the board 24. The terminal portion of the board 24 is brought to the outside through a cutout portion 160 in the side wall of the upper drum 2 and it is connected to the following signal processing circuit. The windings in the rotating yoke 15 of the rotary transformer are positioned on the upper surface of the head mounting member 78 and they are respectively connected to the magnetic heads 8 and 8' mounted on the outer peripheral lower surface of the member 78. A board 28 is a connecting board for this purpose. The head mounting member 78 is fastened at its outer peripheral edge or on the outside of the rotary transformer yoke 15 to the rotary member 75 with screws 12 and in this way it is detachably mounted, along with the heads 8 and 8', the rotary transformer yoke 15, etc., on the rotary member 75.

Figure 4A:
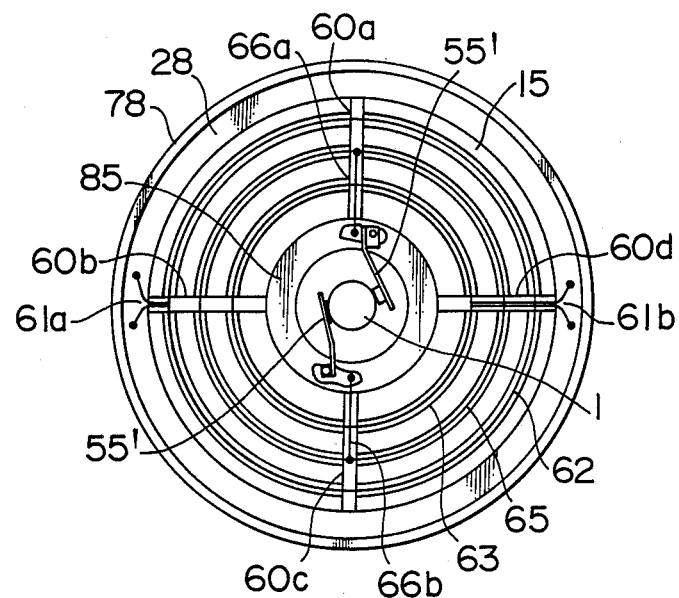
FIG. 4A is a plan view of the rotary transformer in FIG. 1.

The planar construction of the rotary transformer yoke 15 is shown in FIG. 4A. A board 85 is arranged on the inner peripheral surface of the yoke 15 and terminals 66a and 66b of a conductor short-circuit ring 63 provided between channel windings 62 and 63 are connected to the conductor pattern on the board 85 and also grounding brushes 55' are connected to the conductor pattern. The grounding brushes 55' are electrically connected to the short-circuit ring terminals 66a and 66b at the pattern portion on the board 85. The forward ends of the grounding brushes 55' are in contact with the outer surface of the shaft 1. In the Figure, numerals 60a to 60d designate grooves for receiving the channel windings, the short-circuit ring and the terminals, respectively. The windings of the rotary transformer fixed yoke 14 are arranged in the like manner as the rotating yoke 15 so that a short-circuit ring 65' is arranged between channel windings 62' and 63' and the terminals of the short-circuit ring 65' are connected to the holding piece 10 directly or through the board 24. In this construction, the holding piece 10 is made of an electrically conductive material such as aluminum or brass.

Figure 4B:
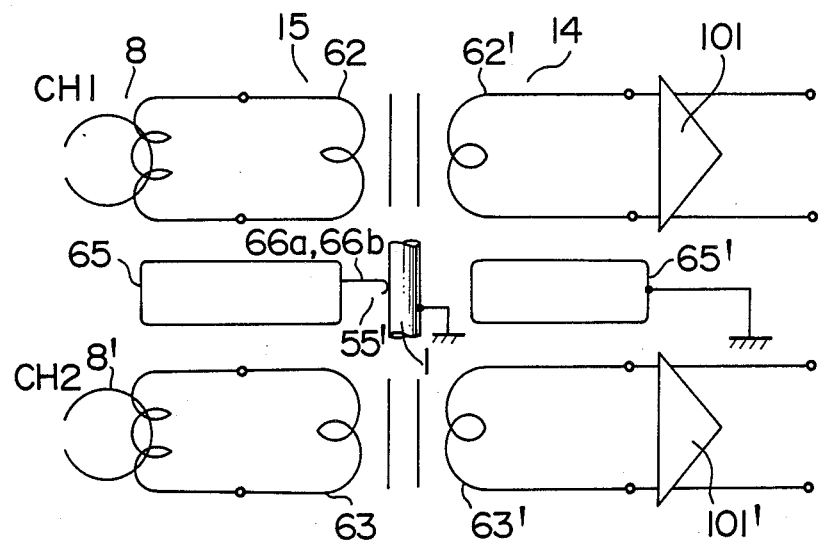
FIG. 4B is a wiring diagram of the rotary transformer.

Shown in FIG. 4B is a wiring diagram of the reproducing system of the rotary transformer windings. The first channel magnetic head 8 is connected to the winding 62 in the rotating yoke 15 of the rotary transformer and the second channel magnetic head 8' is connected to the winding 63 in the fixed yoke 14. The short-circuit ring 65 of the rotating yoke 15 is grounded through the grounding brushes 55' and the shaft 1. In the fixed yoke 14, the terminals of the first channel winding 62' are connected to the first channel amplifier in the amplifier circuit 101 and similarly the second channel winding 63' is connected to the second channel amplifier in the amplifier circuit 101. Also, the short-circuit ring 65' of the yoke 14 is electrically grounded through the holding piece 10 and the shaft 1. The short-circuit rings 65 and 65' are respectively grounded so as to greatly decrease the amount of crosstalk between the channel windings 62 and 63 and between the channel windings 62' and 63'. During recording, the signals from the preceding circuits are amplified by an amplifier circuit 102 for each channel and the signals are supplied to the respective magnetic heads through the associated channel windings of the rotary transformer. The number of the heads and the channel windings is not restricted to two, respectively.

With this construction, the magnetic heads 8 and 8' are rotated by the motor so that the surface of a recording medium such as a tape moving along the side surface of the upper and lower drums 2 and 3 is scanned by the magnetic heads 8 and 8' thereby recording and reproducing signals. The rotation speed is controlled by an FG signal produced in the FG pattern 130 of the FG pattern 95 by a magnetic field variation of the FG magnet 100. Also, the control of the rotation phase with respect to the recording medium is effected by detecting the signal from the TACH sensor 41 and comparing it with a reference signal.

In accordance with the construction of this embodiment, there are effects as enumerated below.

(1) Since the stator coil 21 includes a coreless coil and the yoke 22 is constructed to rotate along with the rotor magnet 18 as a unit, no core loss is caused within the stator. As a result, the motor is made high in efficiency. Also, no magnetic material is used within the stator and thus no attraction acts between the stator and the rotor magnet 18. As a result, no cogging torque is caused thus ensuring a smooth rotation with reduced torque ripple.

(2) Since the attraction of the magnet 18 is prevented from acting on the bearings, the motor is made low in loss and high in efficiency in view of the reduced wear of the bearings. Also, the danger of damaging the component parts, e.g., the bearings during the assemblage is prevented.

(3) Since the stator coil 21 is encased in the molded plastic, the board 25 is comprised of a thin-sheet board instead of a rigid thick board and therefore the thickness of the stator on the whole is made substantially equal to the winding thickness of the coil 21. Thus, the electromagnetic gap (the gap between the pole faces of the magnet 18 and the yoke 22) is reduced and a strong magnetic field is obtained easily. Also, during the coil fabrication, the positioning of coil poles, etc., are effected by the use of a molding die and this increases the accuracy of coil pole arrangement. Also, the manufacture of any complicated stator construction can be easily accomplished at a lower cost.

(4) Since the FG board 95 is attached to the bottom surface of the lower drum 3 of a high dimensional accuracy, it is possible to provide a control system which is capable of generating an FG signal of high accuracy and is high in gain. Furthermore, by providing an annular thin plate yoke made of soft ferrite material at the lower side of the FG board, the FG output may be increased, thereby improving S/N ratio of the signal and reducing the core loss of the FG magnet 100.

(5) Since the magnetic poles of the rotor magnet 18 and the FG magnet 100 are facing downward, the occurrence of magnetic noise in the tape, the heads 8 and 8', the rotary transformer yokes 14 and 15, etc., is reduced considerably.

(6) Since the board 24 is arranged on the rotary transformer yoke 14 and the amplifier circuits 101 and 102, the signal processing circuit 103, etc., are arranged on the surface of the board 24, it is possible to short circuit the lead wire portion to increase the S/N ratio of the signal system.

(7) Since the short-circuit rings of the rotary transformer are grounded, the crosstalk between the channels is decreased greatly. (8) Since the second motor board 25' is provided so that the FG signal amplifier circuit 111, the drive circuit 112, etc., are arranged on the surface of the board 25', the S/N ratio of the FG signal is improved and also the construction is compact.

(9) Since the upper drum 2 is formed with the cutout portion 160 in its side, a part of the rotating assembly is exposed to the outside thus making it easy to make inspection, repair, etc., of the rotating assembly. Also, the adjustment of the gap between the rotary transformer yokes 14 and 15 is easy.

(10) Since the head mounting member 78 is formed with a torus projection 165 at its outermost peripheral portion, a dynamic balance adjusting weight or the like can be easily mounted inside of the projection 165 and the balance adjusting operation can be effected easily in a short period of time.

(11) Since the board 24 is arranged on the rotary transformer yoke 14 and the rotary transformer yoke 14 is mounted on the holding piece 10, even in the unfinished condition where the upper drum 2 has not be assembled as yet, the rotary transformer can be assembled and held in the proper position and its performance can also be checked.

(12) Since only the tips of the heads 8 and 8' are slightly projected and exposed in the gap between the upper and lower drums at the tape moving surface and practically the whole of the rotating assembly including the head mounting member 78, the rotary member 75, etc., is contained between the upper and lower drums, the hurtling sound (air friction sound) caused by the rotating parts is made very small and the resulting wind noise on the whole can be reduced to a low level. Also, the vibrations imparted to the moving tape by the rotating parts are very small. Thus, the reduced jitter and the reduced wow flutter are attained. Also, during the rotation no air film is formed between the tape and the drums and thus there is no danger of the tape floating off the drum surfaces. This results in an excellent head touching performance for the tape and the head output level, the head signal S/N ratio, etc., are improved considerably. The tape tension and the amount of head tip projection are also reduced. Thus, the reduced head tip wear, the reduced tape movement friction, the increased life for the tape and heads, the reduced motor load and the saving of electric power are realized.

(13) The rotational inertia is reduced making it possible to effect the start and stop at high speeds. Also, the reduced amount of dynamic unbalance has the effect of reducing the amount of oscillatory displacement of the rotating parts and reducing the vibrations.

Figure 5A:
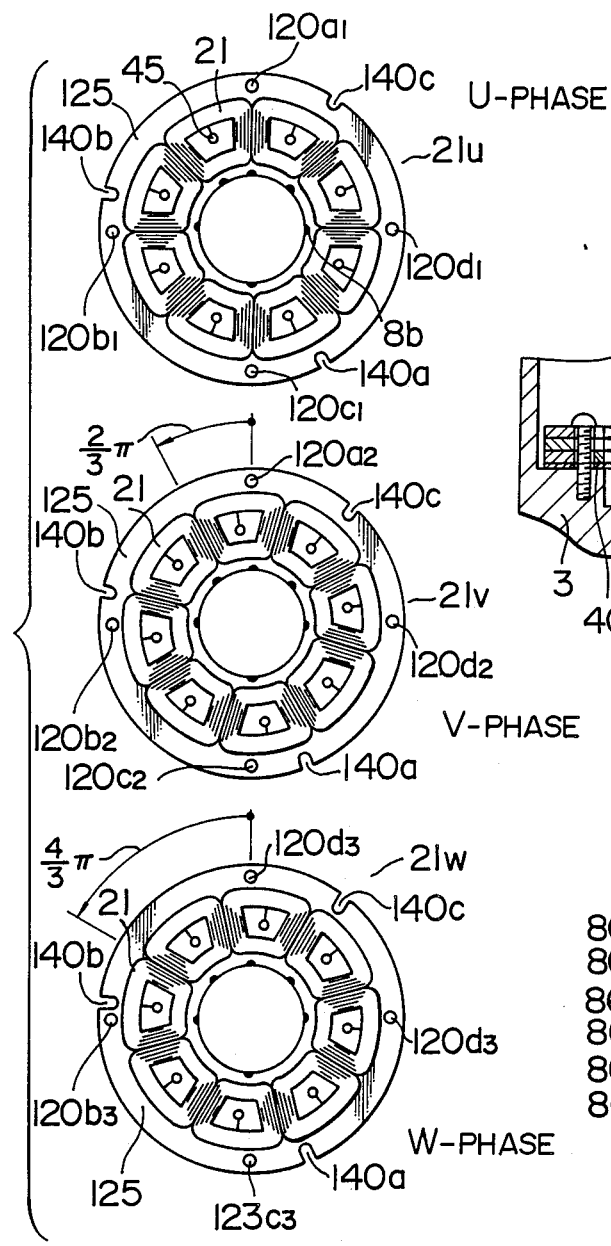
FIG. 5A shows plan views showing another examples of the stator coil construction.
Figure 5B:
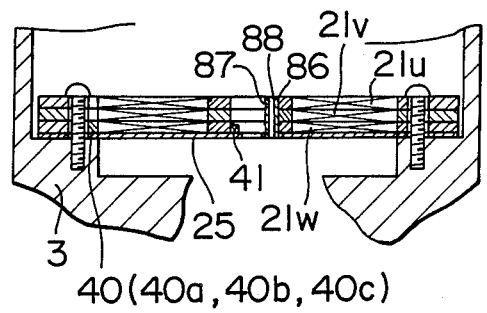
FIG. 5B and 5C are sectional views of FIG. 5A.

FIG. 5 shows another example of the construction of the stator coil 21, which is of an 8-pole structure (the same as the number of poles of the magnet) and including three sheet coils 21u, 21v and 21w arranged one upon another on the board 25. The coil 21u is a U-phase coil, the coil 21v is a V-phase coil, and the coil 21w is a W-phase coil. Each of the phase coils is formed on each of the top and bottom surfaces of an insulating wiring sheet 125 with coil poles composed of 8-pole conductor pattern and the top and bottom conductors are in registration with each other. The top and bottom conductors are interconnected by a spot pattern 45 at the center of each coil pole to connect the sixteen top and bottom poles in series. Numerals $120a_1$ to $120d_1$, $120a_2$ to $120d_2$ and $120a_3$ to $120d_3$ screw holes for mounting the whole coil 21 on the inner periphery of the lower drum 3, 86 a conductor pattern for providing interlaminar connections for the phase coils and connecting them onto the surface of the board 25, 88 a connecting conductor pin inserted into the small hole formed through the conductor pattern 88, and 87 a conductor, e.g., solder for interconnecting the conductor pattern 86 and the conductor pin 88. It is to be noted that instead of using the conductor 87, the conductor pattern 86 and the pin 88 may for example be welded through the energization of the pin 88 to provide the desired interlaminar connections. The sensors 40a to 40c, the TACH sensor 41, etc., are mounted on the surface of the board 25. These sensors are arranged on the coil inner or outer periphery to be outside of the coil poles.

Figure 5C:
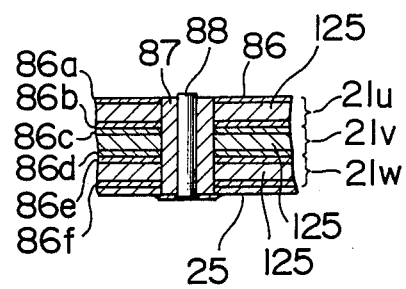

Shown in FIG. 5A are top views of the respective sheets, 5B a sectional view of the coil mounted inside the lower drum 3, and 5C an enlarged view of the interlaminar connection portion. In FIG. 5C, numerals 86a to 86f designate connection patterns formed on the surface of the sheets. With this sheet coil, the coil conductors are produced by a chemical process such as etching or plating so that the resulting coil is thin and the shape and dimensions of the coil poles are high in uniformity and accuracy. Also, the arranging accuracy of the coil poles is very high. The number of coil poles can also be made greater than the number of the magnet poles. By using this sheet coil, it is possible to realize a rotary head apparatus which is thin and small, low in torque ripple, highly smooth in operation and high in efficiency. In FIG. 5A, numerals 140a, 140b and 140c designate notches formed at the outer periphery of the sheets 125 for accommodating the sensors 40a, 40b and 40c, respectively.

Figure 6A:
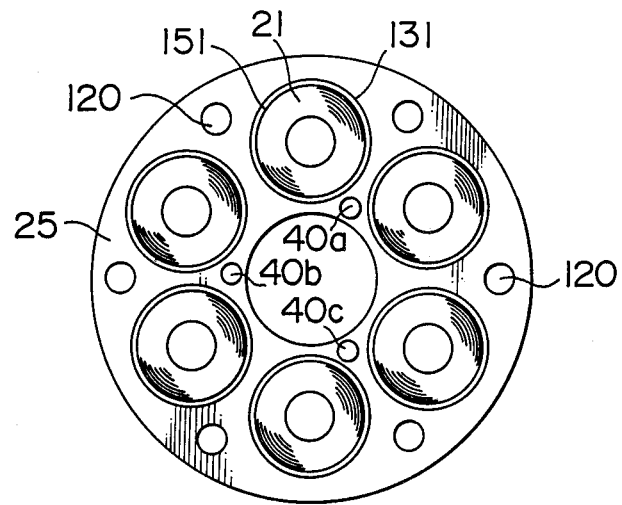
FIG. 6A is a plan view showing still another example of the stator coil construction.
Figure 6B:
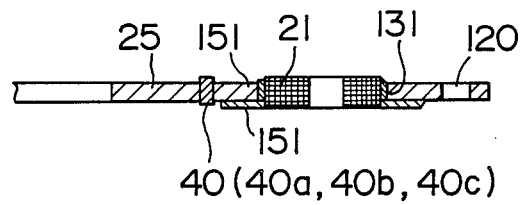
FIGS. 6B and 6C are sectional views of FIG. 6A.
Figure 6C:
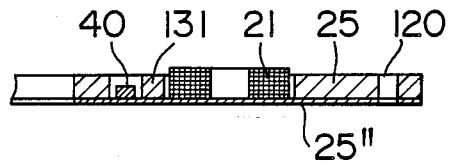

Another example of the stator coil 21 is shown in FIGS. 6A and 6B. With this construction, a plurality of holes 131 for accommodating coil poles are formed in the surface of a rigid board 25 therethrough and each coil pole is held in place with a fixing agent 151. Then, the board 25 is fixedly mounted inside the lower drum 3 by means of small holes 120 in the outer peripheral portion of the board 25. The sensor 40a, 40b and 40c are firmly mounted in other small holes in the board 25. A terminal connecting pattern for the coil poles and the sensors 40a to 40c is formed on the surface of the board 25 to make the necessary connections thereon. Shown in FIG. 6C is a modification of this construction in which a thin-sheet wiring board 25'' and a rigid board 25 are laminated to make a multi-layer construction. In other words, the coil poles, the sensors, etc., are wired onto the thin-sheet board 25'' and they are then fitted into the respective holes of the board 25. Then, the boards 25 and 25'' are laminated thereby holding the components in place. In accordance with this modified construction, it is possible to easily obtain a coreless stator coil at a low cost.

Figure 7:
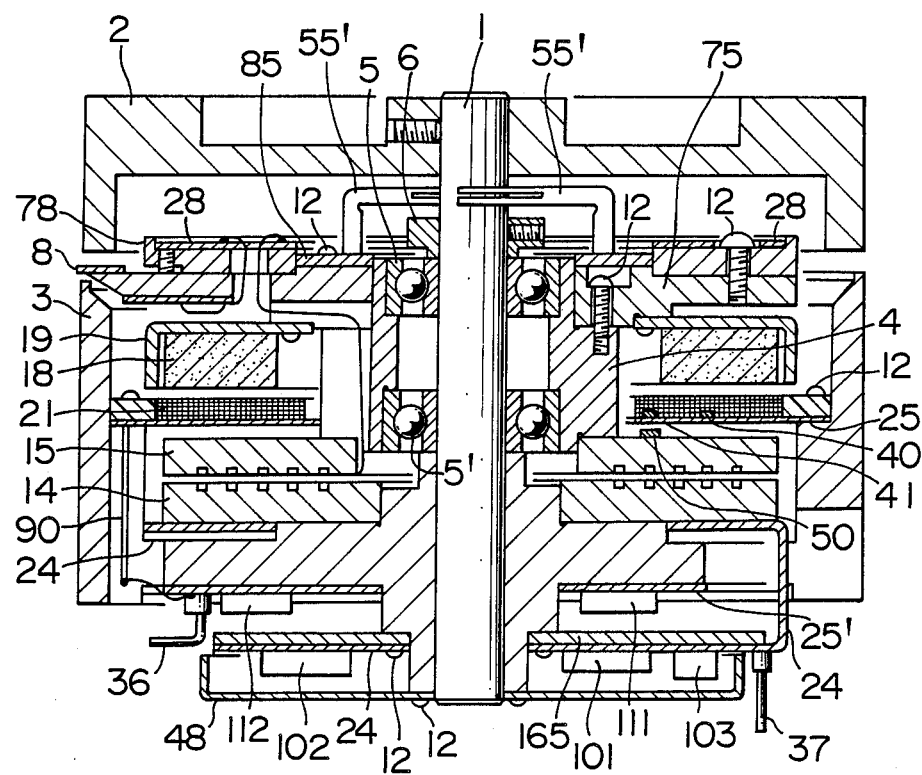
FIG. 7 is a sectional view of a rotary head apparatus according to a second embodiment of the invention.

FIG. 7 shows a second embodiment of the rotary head apparatus according to the invention which is so constructed that the back portion of a rotary transformer rotating yoke 15 serves as a motor magnetic circuit yoke. A rotary transformer fixed yoke 14 is mounted on the inner bottom surface of a lower drum 3 and the opposing rotating yoke 15 is mounted on the lower end face of a rotary sleeve 4. A TACH magnet 50 is arranged on the back surface of the rotating yoke 15. A wiring board 24 is arranged on the back surface of the rotary transformer fixed yoke 14 and an extension terminal surface is attached to the outer bottom surface of the lower drum 3 through an electromagnetic shielding sheet 165. As in the case of the first embodiment, amplifier circuits 101 and 102, a signal processing circuit 103, etc., are mounted and wired onto the board 24. Also, an electromagnetic shielding case 48 is fixed in place below the board 24 to cover the previously mentioned signal circuits. The electromagnetic shielding sheet 165 is provided for the principal purpose of shielding electromagnetic noise from the upper motor assembly and the electromagnetic shielding case 48 is provided to shield noise from the outside of the apparatus. The head mounting structure, etc., of this embodiment are practically the same as in the first embodiment. The second embodiment has the following effects.

(1) Since the rotary transformer yoke 15 is concurrently used as a yoke for the motor magnetic circuit, the number of components and the number of assembling steps are decreased thus reducing the cost.

(2) Since the rotary transformer yokes 14 and 15 are mounted in the lower drum 3, the rotating assembly is constructed to have a low gravitational center thereby improving the rotational stability. Also, the reduced weight of the components mounted on the upper end of the shaft 1 increases the resonant frequency of the supporting system of the shaft 1 and the upper drum 2 and improves the resistance to disturbance.

(3) Since the rotary transformer yokes 14 and 15 are moved away from above the head mounting member 78, the mounting and demounting operations of the heads 8 and 8' are simplified.

(4) Since both of the connecting lead portion 36 of the motor and the connecting lead portion 37 of the rotary transformer signal system are arranged below the lower drum 3, there is less danger of a bending load being applied to the shaft 1 and causing damages to the drum surfaces, the heads, etc., during the handling.

Figure 8:
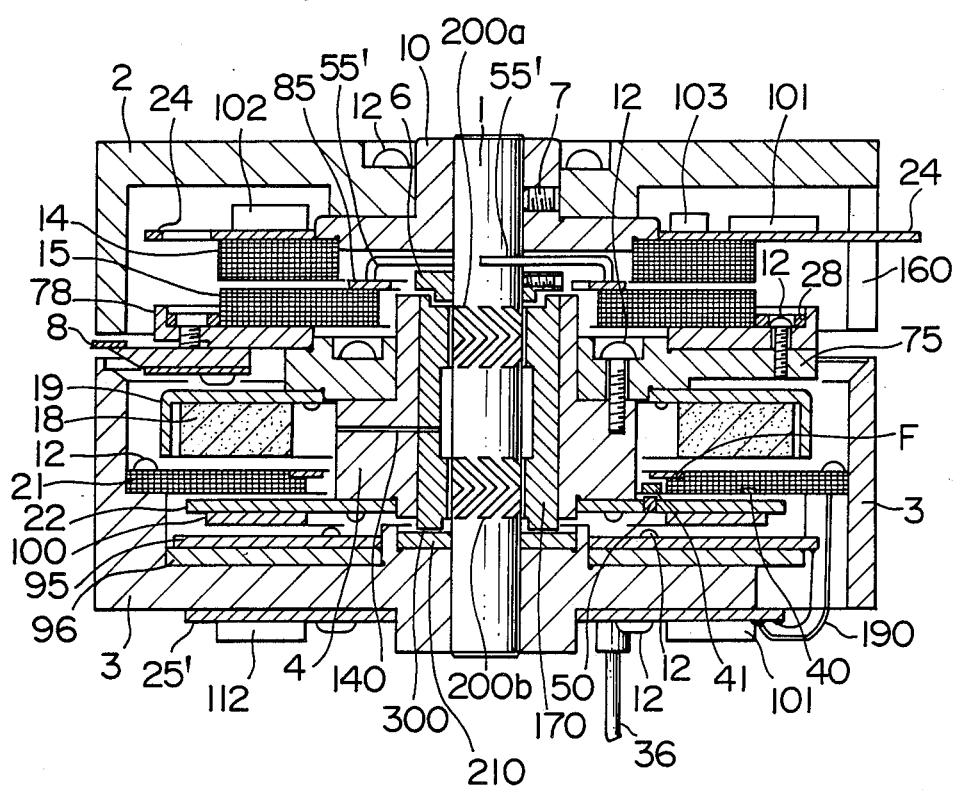
FIG. 8 is a sectional view of a rotary head apparatus according to a third embodiment of the invention.
Figure 9A:
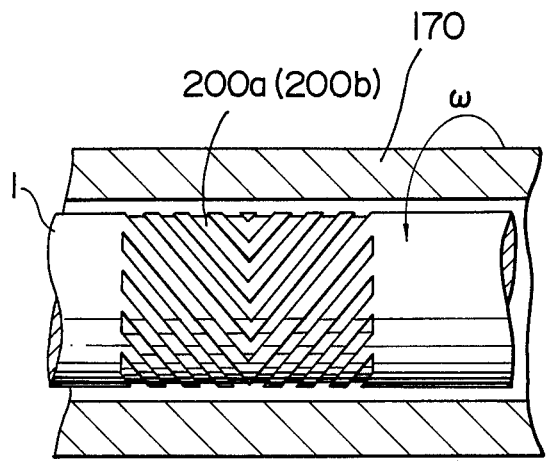
FIGS. 9A and 9B are enlarged views of the bearing unit construction in the third embodiment.
Figure 9B:
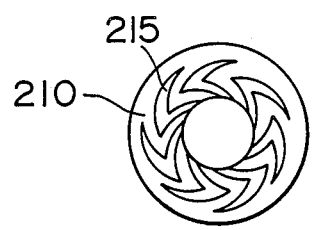
Figure 10A:
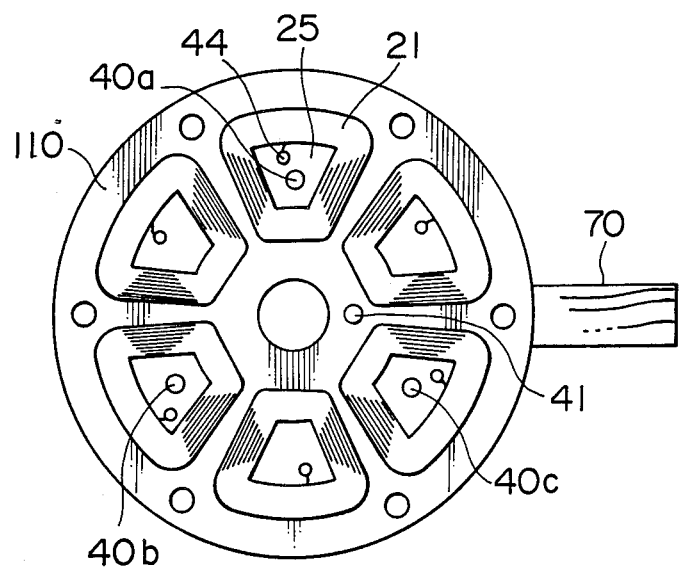
FIGS. 10A and 10B are respectively a plan view and sectional view of the coil structure in the third embodiment.
Figure 10B:
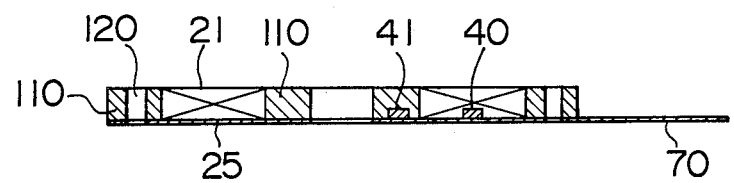

Referring to FIGS. 8 to 10, there is illustrated a third embodiment of the rotary head apparatus according to the invention which is so constructed that a fluid dynamic pressure bearing is used as its bearing. FIG. 8 shows the overall construction of the apparatus and FIGS. 9A and 9B show respectively an enlarged view of the fluid bearing journal, portion and a plan view of the thrust portion. FIG. 10 shows the stator coil. The fluid bearing includes shallow notch-type or herringbone-type grooves 200a, 200b and 215 which are respectively provided at the upper and lower peripheral portions of a fixed shaft 1 and in the upper surface of a thrust load bearing piece 210. A second rotary sleeve (fluid bearing sleeve) 170 is fixedly mounted in the center of a first sleeve 4 so as to face the bearing groove portions at its inner peripheral surface and lower end face through narrow gaps. A lubricating fluid, e.g., grease or oil is filled in the gaps so that when the fluid bearing sleeve 170 is rotated (counterclockwise in the Figure), the lubricating fluid is drawn into the grooves and a fluid dynamic pressure is produced in each groove portion thereby floating the fluid bearing sleeve 170. In other words, the grooves 200a and 200b produce radial dynamic pressures in the journal portion and the groove 215 produces an axial upward dynamic pressure in the thrust portion. Thus, the bearing sleeve 170 is supported in a noncontact manner through the fluid relative to the shaft 1 and the thrust load bearing piece 210. In the construction of this embodiment, the thrust load bearing piece 210 is made of a material having a linear expansion coefficient corresponding to the viscosity temperature characteristic of the fluid so that even if the fluid viscosity is reduced by a temperature rise and the thrust dynamic pressure is decreased thus reducing the amount of floating, its variation is compensated for by the expansion of the bearing piece 210 and the height of the rotating assembly is maintained constant thereby always maintaining magnetic heads 8 and 8' in the desired positions. The fluid bearing sleeve 170 is provided with a recess at each of its upper, middle and lower stepped portions and the fluid is held in the processes. An FG magnet 100 is mounted on the lower surface of a yoke 22 as in the case of the first embodiment. A thin magnetic sheet 96 is disposed on the lower part of an FG board 95. The provision of the magnetic sheet 96 has the effect of causing a thrust attraction between it and the FG magnet 100 to pull the rotating assembly downward. Thus, even if the position of the apparatus is toppled down or turned upside down, the rotating assembly is always held in the given vertical position. Also, there is the effect of increasing the magnetic flux produced from the FG magnet 100 to pass through the FG pattern on the FG board 95 and thereby improving the FG signal output level. Also, the uniformity of the magnetic flux distribution is improved and hence the accuracy of the FG signal is improved. Numeral 140 designates a small hole for venting the air in the fluid bearing. In accordance with the construction of this embodiment using the fluid bearing, there are the following effects in addition to those of the first and second embodiments.

(1) Since the rotating parts are supported in a noncontacting manner relative to the fixed parts, the occurrence of vibrations during rotation is reduced considerably.
(2) Since the outer diameter of the bearing housing (the fluid bearing sleeve 170 and the rotary sleeve 4) is reduced, the performance of the motor can be improved even if the dimensions of the motor magnetic portion are increased.
(3) A longer life is ensured for the bearing.
(4) The cost of the bearing portion is reduced.

A stator coil 21 includes a thin-sheet board 25 with an output portion 70 and a TACH sensor 41 is wired and fixed in place. This coil is also encased in a molded plastic. Symbol F designates for example an annular iron sheet positioned near to the stator coil 21. This iron sheet is attracted to a rotor magnet 18 thus producing a force which opposes the floating force produced by the thrust load bearing piece 210, as is similar to the case of the FG magnet 100 and plate 96. Due to the balance between the floating force and the opposing force, even if the rotary head apparatus is incorporated in a portable VTR or camera so that it takes any kind of position, such as lateral or turn over, its rotating assembly is always allowed to operate properly. It is to be noted that the use of this iron sheet F is not required in a case using ball bearings (FIG. 1). It is also not required in the case where a sufficiently large attractive force is provided between the FG magnet 100 and the plate 96.

Figure 11:
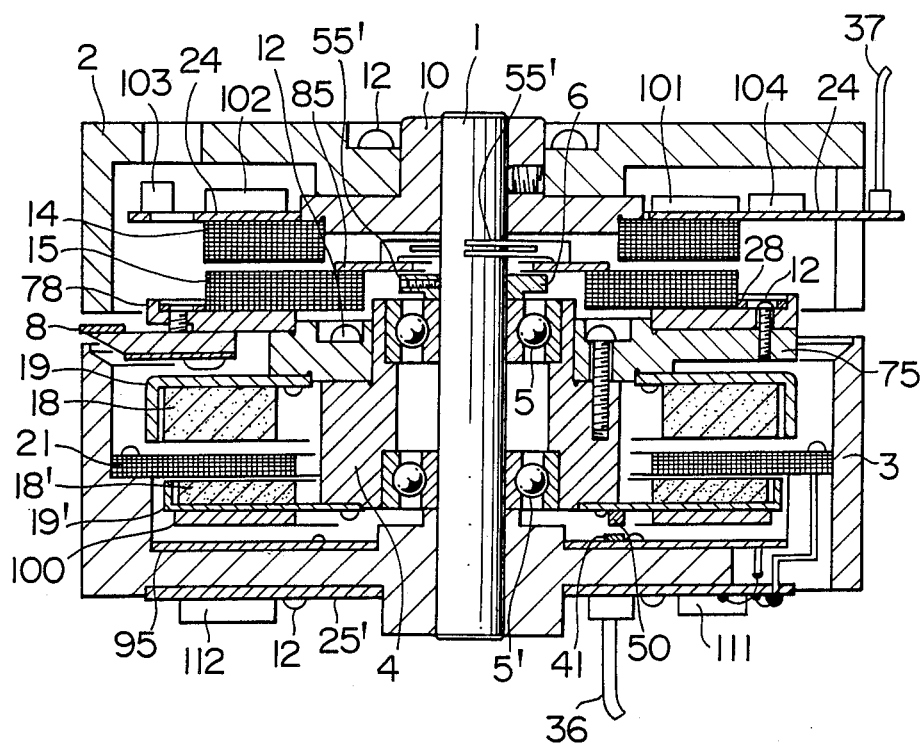
FIG. 11 is a sectional view of a rotary head apparatus according to a fourth embodiment of the invention.
Figure 12A:
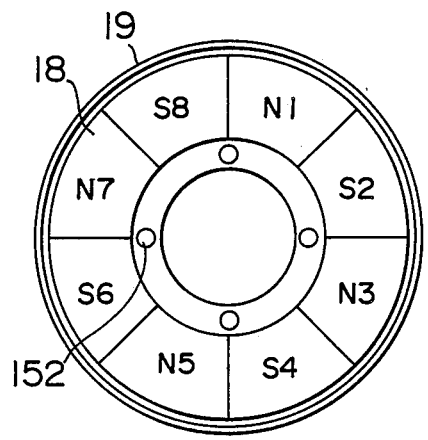
FIGS. 12A and 12B are plan views of the rotor magnets in the fourth embodiment.
Figure 12B:
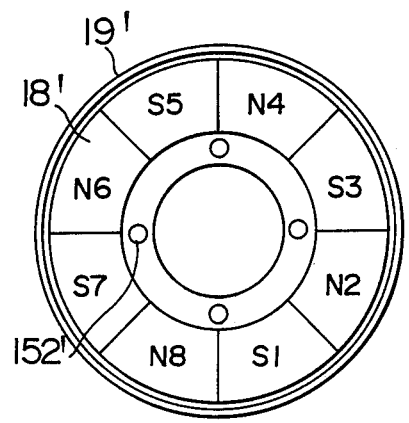
Figure 12C:
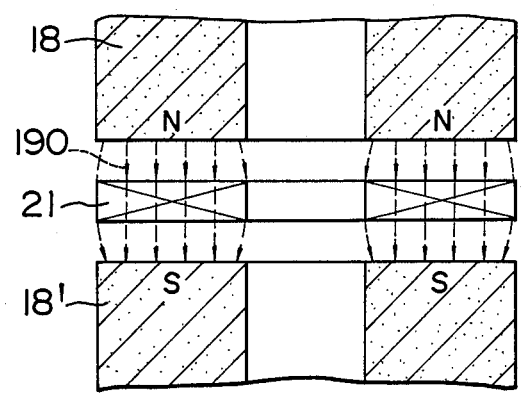
FIG. 12C shows the pole faces of the rotor magnets.

FIGS. 11 and 12 show a fourth embodiment of the invention which employs a DD motor construction in which a rotor magnet includes a pair of magnets (first and second rotor magnets 18 and 18') which are respectively arranged on the top and bottom sides of a coreless stator coil 21 in such a manner that the opposing poles are different from each other. In other words, the different poles of the same numbers, i.e., $N_1$ and $S_1$, $N_2$ and $S_2$, $N_3$ and $S_3$, . . . are respectively opposed to each other. FIG. 11 shows the overall construction of the embodiment, FIGS. 12A and 12B the pole faces of the rotor magnets, and FIG. 12C the arrangement of the opposed poles. In the Figures, the magnets 18 and 18' are respectively attached to rotor yokes 19 and 19' and are respectively mounted on the lower surface of a rotary member 75 and the lower surface of a rotary sleeve 4. With the construction of this embodiment, while the first rotor magnet 18 serves as a main magnet of a greater size and the second rotor magnet 18' serves as an auxiliary magnet of a smaller size, they may have the same size or their relation in size may be reversed. Also, as regards the materials of the magnets 18 and 18', both of them may for example be ferrite magnets or rare earth magnets. Alternatively, they may for example be in the form of a combination in which one is a ferrite magnet and the other is a rare earth magnet. The use of ferrite material for the main magnet reduces the cost. An FG magnet 100 is mounted on the back surface of the rotor yoke 19'. An FG board 95 is arranged on the bottom surface of a lower drum 3 to face the FG magnet 100. The stator coil 21 is encased in a molded plastic as in the case of the first embodiment. The other parts are practically the same in construction with those of the first embodiment. The construction of this embodiment has the following effects.

(1) Due to the use of the two rotor magnets of the opposed heteropolar type, the magnetic path length of the magnet magnetic circuit is reduced and a strong magnetic field can be easily obtained even in the case of thin-section magnets or low energy product, low cost magnets, e.g., ferrite magnetic. Thus, it is possible to increase the motor constant values to improve the antiload stability and also the cost can be reduced.
(2) The attractions of the rotor magnets 18 and 18' do not act on the bearings 5 and 5'. Therefore, the load on the bearings is reduced and the frictional torque is reduced considerably.
(3) Since the magnetic field distribution between the poles of the two magnets is increased in uniformity, the magnetic flux passing through the stator coil is increased with the resulting increase in the motor efficiency. Also, there is the effect of decreasing the rate of deterioration of the motor performance such as the increased torque ripple due to a shift in the fixed position of the stator coil in the gap. This simplifies the assembling operations and the control of accuracy.
(4) Since the permanence of the magnet magnetic circuit is high, the amount of magnetic leakage to the outside is reduced considerably. This reduces the occurrence of noise in the rotary magnetic heads, the signal circuits, etc.
(5) By suitably selecting and combining the dimensions, materials, magnetic pole shapes, etc., of the rotor magnets 18 and 18' relatively, it is possible to vary the magnetic field distribution and the amount of magnetic flux to increase the motor efficiency and reduce the torque ripple and the cost.

Figure 13:
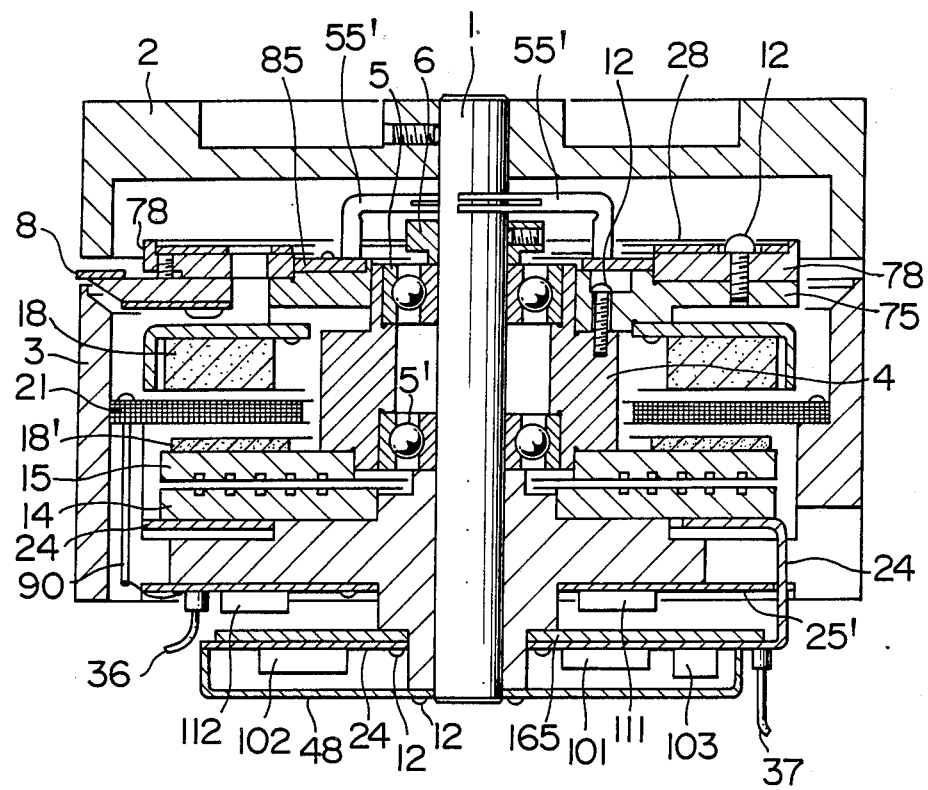
FIGS. 13 and 14 are sectional views showing respectively rotary head apparatus according to fifth and sixth embodiments of the invention.

FIG. 13 shows a fifth embodiment of the invention which differs in construction from the second embodiment of FIG. 7 in that a second rotor magnet is mounted on the back surface of the rotating yoke 15 of the rotary transformer. Thus, the similar effects to the effects (1) to (5) of the fourth embodiment, such as, the production of a uniform and strong magnetic field due to the use of the inexpensive magnets are obtained in addition to the effects of the second embodiment.

Figure 14:
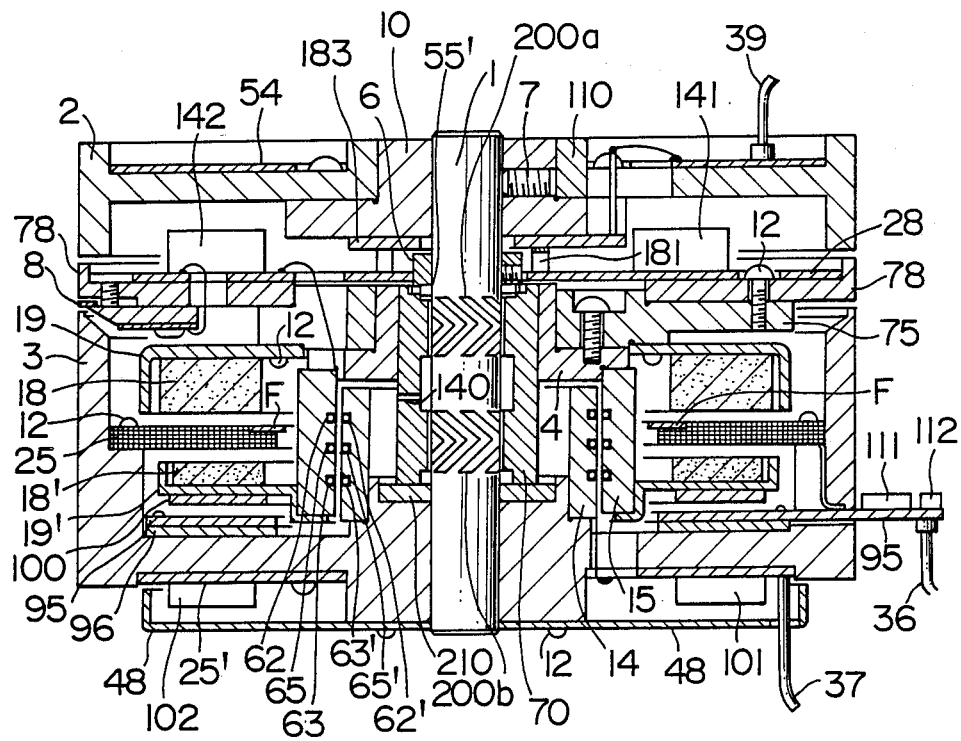

FIG. 14 shows a sixth embodiment of the invention which is constructed so that a fluid dynamic pressure bearing is used in place of the ordinary bearings and cylindrical rotary transformer yokes 14 and 15 are arranged on the outer periphery of the fluid bearing. The construction of its motor assembly is the same as in the fourth embodiment. Magnetic heads 8 and 8', a connection pattern for the rotary transformer yoke 15 and head signal amplifier circuits 141 and 142 are arranged on a board 28 on a head mounting member 78. The supply of power to the amplifier circuits 141 and 142 is effected by feeder brushes 181 disposed on the board 28 and slip rings 187 and 188 disposed on a board 183. The slip rings 187 and 188 are connected to the power source through a lead wire 39.

Figure 15:
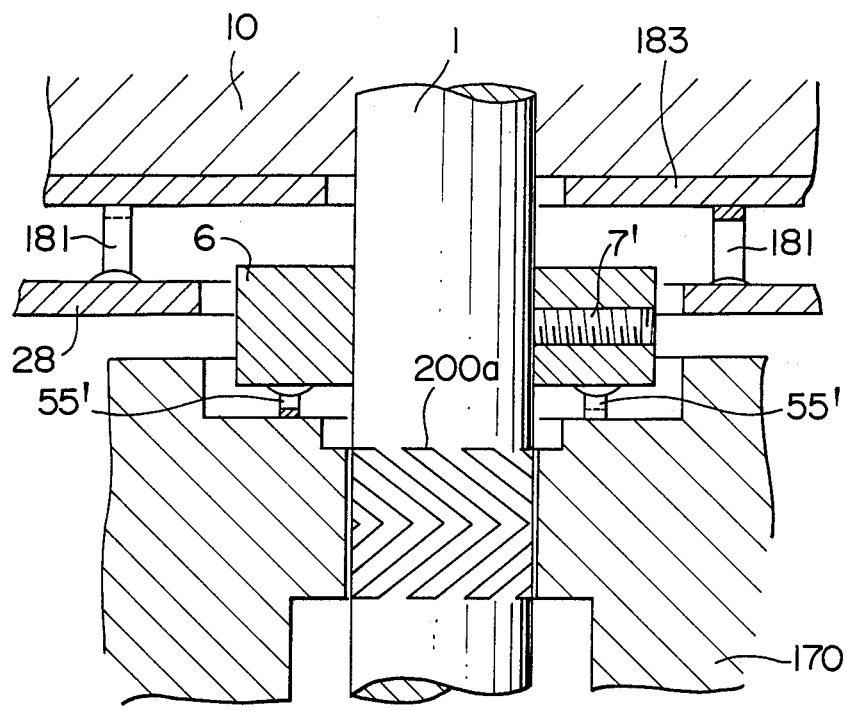
FIG. 15 is an enlarged view showing the construction of the brush contactors in the sixth embodiment.
Figure 16:
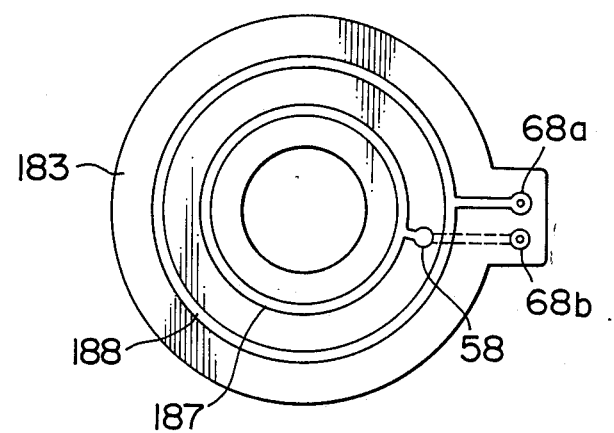
FIG. 16 is a plan view of the slip ring board in the sixth embodiment.

FIG. 15 is an enlarged view of the brush assembly and FIG. 16 is a plan view of the slip ring board 183. Numeral 55' designates grounding brushes for electrically connecting the upper end of a fluid bearing sleeve 170 to a member 6 to ground the rotating assembly. An FG signal amplifier circuit 111 and a motor drive circuit 112 are wired to an output portion on an FG board 5. A magnetic sheet 96 is disposed on the lower side of the board 95 so as to provide the same action as in the case of the third embodiment. The winding terminal connector of the rotary transformer fixed yoke 14 and signal amplifier circuits 101 and 102 are arranged on a board 25' on the lower surface of a lower drum 3.

As mentioned in FIG. 8, F is an iron plate for restricting the surfacing force due to the thrust load bearing piece 210. In also this embodiment, the iron plate F is not required in the case where a sufficiently large attraction force is provided between the FG magnet 100 and the plate 96.

Figure 17:
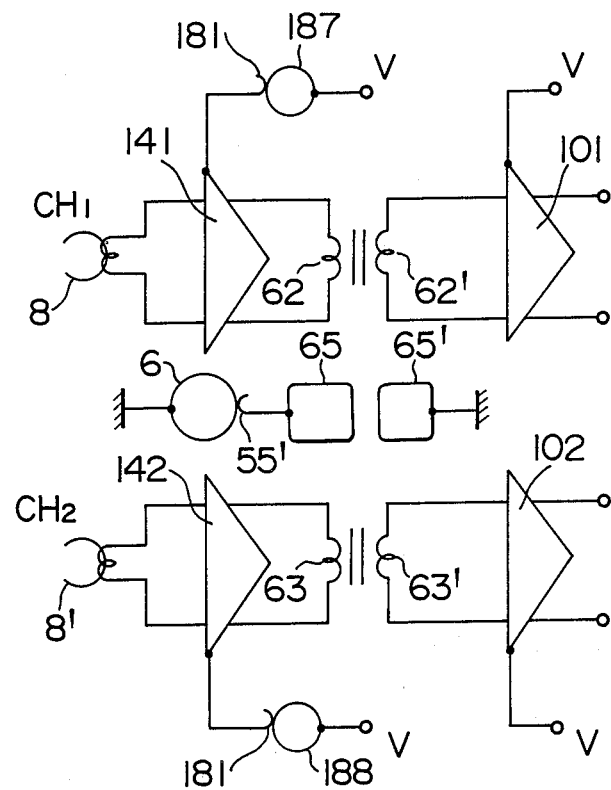
FIG. 17 is a wiring diagram showing the connections of the rotary transformer in the sixth embodiment.

FIG. 17 is an interconnection diagram showing the connections between the rotary transformer windings, the brushes 55', the slip rings 187 and 187', etc. In accordance with the construction of this embodiment, the various effects previously mentioned in connection with the third embodiment, i.e., the vibration reducing effect due to the use of the fluid dynamic pressure bearing, the reduced bearing size and the resulting increase in the motor size and the performance improving effect in addition to those mentioned in connection with the fourth embodiment. Also, there is the effect of producing signals of high S/N ratios due to the arrangement of the signal amplifier circuits 141 and 142 within the rotating assembly to be close to the heads 8 and 8' for signal processing.

Figure 18A:
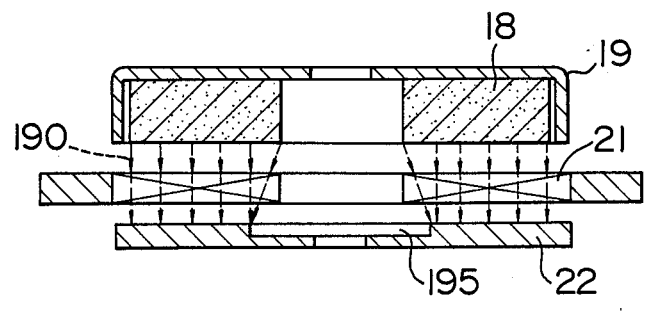
FIGS. 18A, 18B and 18C are sectional views showing another examples of the rotary magnet and yoke combination.
Figure 18B:
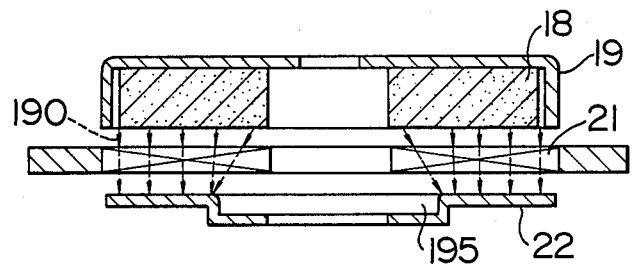
Figure 18C:
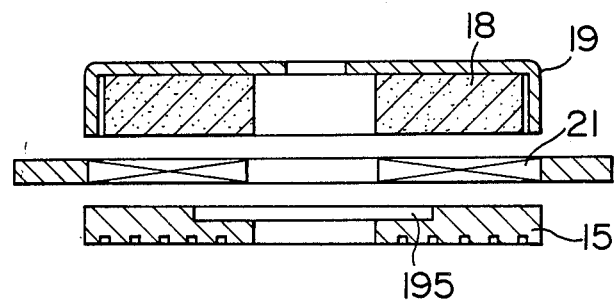

FIG. 18 shows another exemplary constructions of the combination of the rotor magnet 18 and the yoke 22. Shown in FIG. 18A is the construction in which a torus recess 195 is formed along the inner peripheral edge of the center hole in the yoke 22, (B) the construction in which a recess 195 is provided by slightly drawing the inner peripheral edge of the center hole, and (C) the construction in which the similar recess is formed in the back surface of the rotary transformer yoke 15 as in the case of (A). These combination constructions have the effect of efficiently converging the magnetic flux from the rotor magnet 18 to the outer peripheral side of the yoke 22 and causing the magnetic flux to pass through the coil 21 at large radial positions to increase the motor constants and hence the motor efficiency and the rotation stability. In the Figures, numeral 190 designates the flow paths of the flux.

Figure 19:
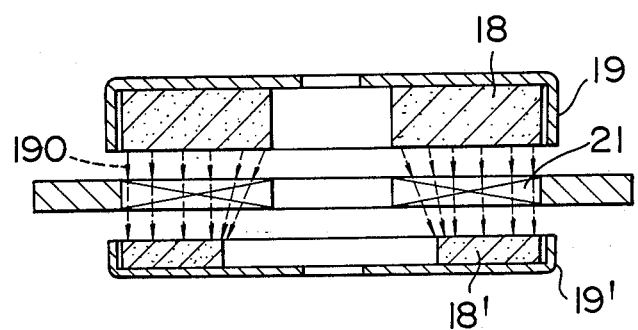
FIG. 19 is a sectional view showing an example of the combination of the first and second rotor magnets.

FIG. 19 shows another exemplary construction of the combination of the first and second magnets 18 and 18' in which the inner diameter of the second rotor magnet 18' is selected greater than that of the first rotor magnet 18. As in the case of the constructions shown in FIG. 18, this construction has the effect of converging the magnetic flux 190 generated from the first rotor magnet 18 toward the outer radial side of the stator coil 21 and thus there are the same effects as in the case of FIG. 18, e.g., the increased motor efficiency and the increased rotation stability.

Figure 20A:
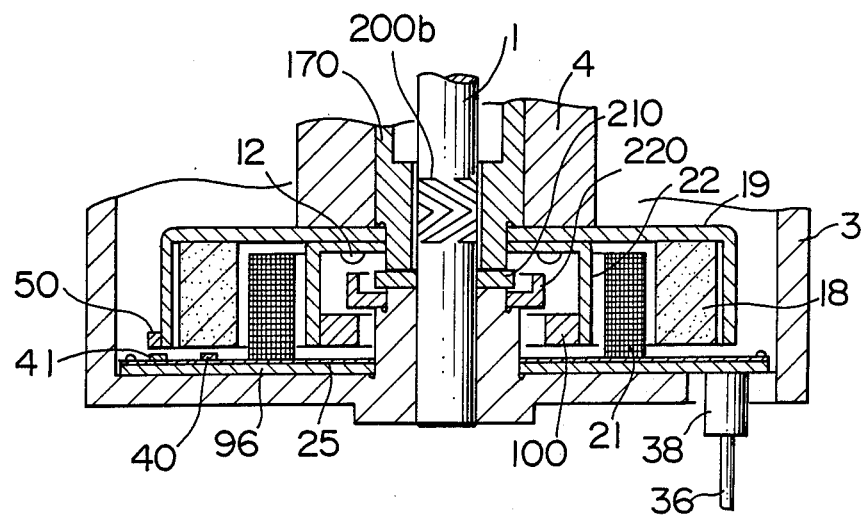
FIGS. 20A and 20B are sectional views showing a rotary head apparatus according to an seventh embodiment of the invention and its modification, respectively.
Figure 20B:
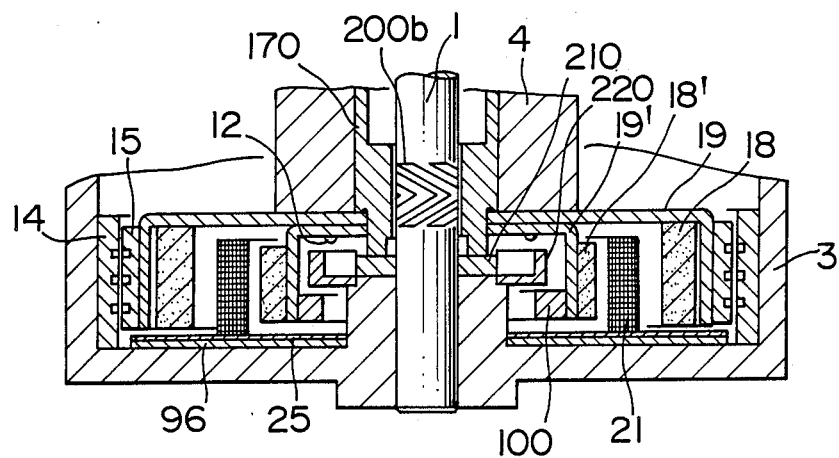

FIG. 20 shows a seventh embodiment of the apparatus according to the invention in which an opposed periphery type motor is incorporated as a DD motor below a rotary sleeve 4 and a cylindrical rotor magnet 18 and a cylindrical yoke 22 are rotated, with a stator coil 21 interposed therebetween, as shown in (A) of the Figure. In (B) of the Figure showing a modification of the seventh embodiment, first and second rotor magnets 18 and 1840 of cylindrical shape are similarly rotated. Particularly in the modification shown in (B), rotary transformer yokes 14 and 15 of cylindrical shape are arranged in the space defined by the outer periphery of a rotor yoke 19 and a lower drum 3. Also, in either of the cases an FG magnet 100 is arranged on the inner side of the yokes 22 and 19 with its magnetic poles facing the surface of a board 25. The terminal wiring pattern of the coil 21, a sensor wiring pattern and an FG pattern are arranged on the surface of the board 25. Numeral 96 designates a magnetic sheet for producing a thrust attraction between the magnets 18, 18' and 100 such that the rotating assembly including the magnets, the heads, etc., is always attracted toward the lower drum side to ensure a stable operation in any one of the various positions of the apparatus. A fluid dynamic pressure bearing is used as its bearings. While, in the cases of FIGS. 20A and 20B, the iron sheet F shown in FIGS. 8 and 14 is eliminated, the reason is that the provision of this iron sheet is not required. It is to be noted that the magnetic sheet 96 serves the same function as served by the iron sheet F. In accordance with the construction of this embodiment, the whole motor rotor is preliminarily mounted in the rotary sleeve 4 and the resulting semiassembly is fitted on the shaft 1 thereby simplifying the assembling operations, reducing its number and automating the operations. The mounting and demounting of the heads is also simplified. In the Figure, numeral 220 designates a lubricating fluid container.

While each of the above-mentioned embodiments uses the 3-phase 8-pole DD motor employing the sensors 40a to 40c, it is possible to use a motor which is different in number of phases, number of poles, number of sensors and sensor construction from the DD motor. The invention also covers other motor constructions employing no sensors. Also, where the magnetic material in a form different from that in FIGS. 8 and 14 forms a part of the stator coil and it is possible to produce a rotating assembly supporting attractive force between the rotating assembly and the rotor magnet(s). Further, where the fluid bearing is used, it is possible to use a structure for producing a thrustwise (downward) fluid dynamic pressure at the upper end of the fluid bearing sleeve 170, that is, a herringbone groove may be formed in the lower surface of the holding piece 6 in FIG. 8 or 14 so as to produce a fluid dynamic pressure between the herringbone groove and the upper end of the sleeve 170. Still further, it is possible to use a structure in which a magnet is attached to each of the upper end face of the rotating part, e.g., upper end of the sleeve 170 and the lower end face of the fixed part, e.g., the lower end of the holding piece 6 such that their magnetic poles of the same polarity face each other thereby utilizing their repulsions to produce a downward thrust force. Still further, the invention covers those constructions in which a fluid dynamic pressure bearing as shown in FIGS. 8 and 14 is used but its motor assembly includes no magnetic sheet 96. Still further, while, in all of the above-described embodiments, the upper drum 2 is fixed and the head mounting member 78 is rotated below the upper drum 2, the invention covers other constructions in which the upper drum 2 is eliminated and the outer periphery of the head mounting member 78 is substantially the same as the upper drum 2, that is, so-called upper drum rotating-type construction (in fact the head mounting member 78 is rotated).

In the embodiment mentioned above, there is provided the ground brush 55' to ground the short-circuit ring 65 on the rotation side yoke 15 to the fixed sided conductive body, however it may be possible to provide no brush and no ground of the ring 65. In this case, the ring 65 may be entirely not connected to any body, or the termination 66a (66b) of the ring 65 may be connected to the rotation side conductive body such as the head mounting construction 78. Similarly, the ring 65' on the fixed yoke 14 may be not necessary to connect it to the ground. The windings 62, 62', 63 and 63' and the short-circuit rings 65 and 65' may be made by using an etching method or a plating method. In the embodiment of FIG. 1, the magnet 18 may be replaced by the yoke 22 and simultaneously the yoke may be replaced by the magnet 18.

Thus, the rotary head apparatus according to the invention has various effects which will be summarised as follows.

(1) Due to the construction which uses the coreless stator coil without any stator yoke, no iron loss is caused by the magnet rotation. Also, due to elimination or great reduction of the attraction of the magnets acting on the bearings, the wear of the bearings is reduced. Thus, the losses are decreased greatly and the motor is high in efficiency. Also, damages to the components during their assembling are prevented.

(2) Due to the construction using no magnetic material within the stator, the occurrence of any cogging due to such material during rotation is prevented. Also, due to the increased uniformity in the rotor magnet field distribution at the coil position, the occurrence of torque ripple is reduced. Particularly, due to the rotor magnet construction including two magnets arranged in an opposed heteropolar manner on the sides of the coil, it is possible to easily produce a highly uniform strong magnetic field with the resulting reduced size and increased efficiency of the motor assembly.

(3) Due to elimination or great reduction of the thrust load due to the magnet attraction, it is possible to use a fluid bearing for the thrust bearing portion so as to realize a low vibration structure.

(4) Particularly, with the construction employing the fluid bearing, the size of the bearing unit is reduced and also the cost is decreased.

(5) Due to the construction employing the stator coil encased in a molded plastic or the like, the coil can be easily made into a rigid form having a high strength without using any rigid wiring board. The stator has the same or substantially the same thickness as the winding thickness of the coil and this reduces the magnetic gap making it easy to produce a strong magnetic field. With the coil construction made by preliminarily connecting coil terminals and sensor terminals to a wiring board and encasing it by a molded plastic, it is still possible to use a thin-sheet board for the wiring board to reduce the thickness of the stator to substantially the thickness of the coil alone without practically increasing the total thickness. Also, the arranging and attaching accuracy of the coil poles and the sensors can be readily enhanced. Further, even a multi-stator construction can be manufactured easily at a low cost.

(6) Due to the apparatus construction of the upper drum fixed type, floating of the recording medium (tape) from the drum surfaces is prevented thus ensuring an excellent tape-head indirect touching quality. Also, low-vibration and low-noise properties can be realized.

(7) Due to the upper drum fixed type, the disturbance vibrations imparted to the tape are reduced greatly with the corresponding reduction in jitter.

(8) Due to the reduced effect of the assembling accuracy, surface conditions, etc., of the upper drum, it can be produced easily at a low cost.

(9) Since the reduction in the tape tension and the reduction in the amount of tip head projection are possible, it is possible to reduce the wear of the head tips and the tape movement friction. Thus, a longer life for the heads and the tape, reduction in the motor load and saving of the electric power can be realized.

(10) Due to the reduced rotational inertia, high speed starting and stopping are possible.

We claim:

1. A rotary head apparatus comprising:
a hollow upper cylindrical drum;
a hollow lower cylindrical drum forming a pair with said upper drum;
a center shaft for fixedly connecting said upper and lower drums;
rotary head means rotatably received in a hollow space defined by said upper and lower drums and including a plurality of magnetic heads;
bearing means for rotatably supporting said rotary head means around said center shaft;
brushless motor of flat formation type including a stator coil fixed to said hollow lower cylindrical drum and motor magnetic circuit means having a magnet and a cooperating member disposed in opposition to said magnet, said stator coil having a respective coil pole thereof disposed in a plane perpendicular to the rotation axis of said center shaft and said magnet having a respective magnetic pole thereof disposed in a plane perpendicular to the rotation axis of said center shaft, said stator coil being sandwiched between said magnet and said cooperating member and said magnet and said cooperating member being integrally fixed to said rotary head means; and a rotary transformer mounted between said hollow upper cylindrical drum and said rotary head means, and an opening mounted on a side wall of said hollow upper cylindrical drum for leading outwardly wiring members of said rotary transformer mounted within said hollow upper cylindrical drum.

2. An apparatus according to claim 1, wherein said cooperating member of said motor magnetic circuit means is a yoke.

3. An apparatus according to claim 2, wherein said bearing means include grooves for generating a fluid dynamic pressure as supporting means for supporting a thrust load.

4. An apparatus according to claim 2, wherein said bearing means include grooves for generating a fluid dynamic pressure as supporting means for supporting a journal load.

5. An apparatus according to claim 2, wherein the outer diameter of a bearing housing is set to the diameter smaller than the inner diameter of said stator coil, and said brushless motor magnet and yoke are fixed on said bearing housing.

6. An apparatus according to claim 2, wherein said bearing means comprises a fluid dynamic pressure bearing having a thrust load receiving portion at the bottom portion of said hollow lower cylinder.

7. An apparatus according to claim 2, wherein each of said brushless motor magnet and yoke is formed into an annular shape, and wherein said magnet has an inner diameter smaller than an inner diameter of said brushless motor yoke, or than an outer diameter of an annular recess portion provided on the inner periphery of said yoke.

8. An apparatus according to claim 2, wherein there is provided rotation speed signal generating means between the inner surface of said hollow lower cylindrical drum and said brushless motor magnet and yoke.

9. An apparatus according to claim 1, wherein said cooperating member of said motor magnetic circuit means includes another magnet, said another magnet having a respective magnetic pole thereof disposed in a plane perpendicular to the rotation axis of said center shaft.

10. An apparatus according to claim 9, wherein said bearing means include grooves for generating a fluid dynamic pressure as supporting means for supporting a thrust load.

11. An apparatus according to claim 9, wherein said bearing means include grooves for generating a fluid dynamic pressure as supporting means for supporting a journal load.

12. An apparatus according to claim 9, wherein said another magnet is disposed so that each pole of said another magnet opposite to each pole of said magnet has a different polarity with respect to said opposite pole of said magnet.

13. A rotary head apparatus according to claim 1, wherein said wiring members of said rotary transformer are provided with head signal processing circuits on the surface thereof.

14. An apparatus according to claim 1, further comprising amplifier means arranged on said rotary head means for amplifying outputs and inputs of said magnetic heads.

15. An apparatus according to claim 1, wherein said stator coils are molded in a body.

* * * * *